US008611507B2

(12) United States Patent
Mikan et al.

(10) Patent No.: US 8,611,507 B2
(45) Date of Patent: *Dec. 17, 2013

(54) SYSTEMS AND METHODS FOR INTELLIGENT CALL TRANSCRIPTION

(71) Applicant: AT&T Mobility II LLC, Atlanta, GA (US)

(72) Inventors: Jeffrey Mikan, Atlanta, GA (US); Justin McNamara, Atlanta, GA (US); John Lewis, Lawrenceville, GA (US); Fulvio Cenciarelli, Suwanee, GA (US)

(73) Assignee: AT&T Mobility II LLC, Atlanta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/690,955

(22) Filed: Nov. 30, 2012

(65) Prior Publication Data

US 2013/0089189 A1  Apr. 11, 2013

Related U.S. Application Data

(63) Continuation of application No. 12/340,297, filed on Dec. 19, 2008, now Pat. No. 8,351,581.

(51) Int. Cl.
*H04M 1/64* (2006.01)

(52) U.S. Cl.
USPC ................................. 379/88.11; 379/88.14

(58) Field of Classification Search
USPC ............... 379/68, 88.08, 88.11, 88.22, 88.23, 379/67.1, 88.14; 704/1, 200
See application file for complete search history.

(56) References Cited

U.S. PATENT DOCUMENTS

| 5,519,608 | A | 5/1996 | Kupiec |
| 5,530,950 | A | 6/1996 | Medan et al. |
| 5,696,962 | A | 12/1997 | Kupiec |
| 5,732,216 | A | 3/1998 | Logan et al. |
| 5,742,736 | A | 4/1998 | Haddock |
| 5,960,447 | A | 9/1999 | Holt et al. |
| 6,327,343 | B1 | 12/2001 | Epstein et al. |
| 6,434,520 | B1 | 8/2002 | Kanevsky et al. |
| 6,587,822 | B2 | 7/2003 | Brown et al. |
| 6,816,468 | B1 | 11/2004 | Cruickshank |
| 6,850,609 | B1 | 2/2005 | Schrage |
| 6,876,729 | B1 | 4/2005 | Kuter et al. |
| 7,047,192 | B2 | 5/2006 | Poirier |
| 7,092,888 | B1 | 8/2006 | McCarthy et al. |
| 7,133,513 | B1 * | 11/2006 | Zhang ................ 379/202.01 |
| 7,231,351 | B1 | 6/2007 | Griggs |
| 7,292,979 | B2 | 11/2007 | Karas et al. |
| 7,346,505 | B1 | 3/2008 | Sherwood |
| 7,860,722 | B1 | 12/2010 | Chow |
| 7,983,910 | B2 | 7/2011 | Subramanian et al. |
| 7,991,613 | B2 | 8/2011 | Blair |
| 8,032,356 | B2 | 10/2011 | Narayanan et al. |
| 8,223,944 | B2 | 7/2012 | Cloran et al. |

(Continued)

*Primary Examiner* — Olisa Anwah

(74) *Attorney, Agent, or Firm* — Woodcock Washburn LLP

(57) ABSTRACT

Intelligent call transcript systems and methods are disclosed. An intelligent call transcript system can create a transcript of a telephonic communication and supplement the transcript with additional information automatically or upon request. Additional information may be added when key words are detected, such as adding acronym expansion when an acronym is detected or adding identifying information to an important task when mention of the task is detected. Portions of the transcript may also be sent as messages, text-based or audio, upon detection of key words or at the instruction of a user or device.

20 Claims, 8 Drawing Sheets

(56) References Cited

U.S. PATENT DOCUMENTS

| | | |
|---|---|---|
| 8,351,581 B2 | 1/2013 | Mikan et al. |
| 2002/0077833 A1 | 6/2002 | Arona et al. |
| 2003/0128820 A1 | 7/2003 | Hirschberg et al. |
| 2006/0106602 A1 | 5/2006 | Caldwell et al. |
| 2007/0071206 A1 | 3/2007 | Gainsboro et al. |
| 2007/0081428 A1 | 4/2007 | Malhotra et al. |
| 2007/0116204 A1 | 5/2007 | Doulton |
| 2007/0117544 A1 | 5/2007 | Doulton |
| 2007/0133437 A1 | 6/2007 | Wengrovitz et al. |
| 2007/0174388 A1 | 7/2007 | Williams |
| 2007/0244700 A1 | 10/2007 | Kahn et al. |
| 2007/0244702 A1 | 10/2007 | Kahn et al. |
| 2009/0252305 A1* | 10/2009 | Rohde et al. ............... 379/88.13 |
| 2009/0307090 A1 | 12/2009 | Gupta et al. |
| 2009/0326939 A1 | 12/2009 | Toner et al. |
| 2010/0121629 A1 | 5/2010 | Cohen |
| 2010/0153106 A1* | 6/2010 | Frazier et al. ................. 704/235 |
| 2010/0268534 A1 | 10/2010 | Thambiratnam et al. |
| 2011/0013756 A1 | 1/2011 | Davies et al. |

* cited by examiner

SYSTEMS AND METHODS FOR INTELLIGENT CALL TRANSCRIPTION

CROSS-REFERENCE TO RELATED APPLICATIONS

This application is a continuation of, and claims priority to, U.S. patent application Ser. No. 12/340,297, filed Dec. 19, 2008, entitled "Systems and Methods for Intelligent Call Transcription" the entire contents of which are hereby incorporated herein by reference.

BACKGROUND

During telephone conversations, including conference calls, participants in the conversation may often find it useful to have a transcript of the conversation. Other interested parties who were not participants in the call may also find it useful to have a transcript. While transcription technology has advanced in recent years, it can be difficult to get the complete meaning of words spoken without hearing the speaker's voice, including characteristics such as the tone, inflection, emphasis, and other qualities of the spoken words.

Often during a telephonic communication, such as a conference call, items will be discussed that need to be addressed or remembered at a later time. It can be difficult to identify these items at a later time, even with a transcript of the communication, especially if the conversation was over an extended period of time, resulting in a lengthy transcript. This is even more of a problem if the person reviewing the transcript was not participating in the telephonic communication. In these and other situations there exists a need to improve to functionality and usefulness of transcription systems.

SUMMARY

Systems and methods are provided herein for intelligent call transcript systems and methods. A telephonic or other audible communication may be transcribed into text by using the systems and methods described. Events may be detected that trigger actions taken by the system. Events may include the detection of key words, phrases, or other sounds. Events may also include the receipt of commands or instructions by the system. The action taken in response to the detections of an event may include adding supplemental information to the transcript. Such information may include translations, expansion of acronyms, links to other information, links to audio recordings of the communication, tags, indicators of important portions of the transcript, pictures, emoticons, video, or any other information that may be of interest.

Other actions taken may include sending a message with a portion of the transcribed text to a user or device. Alternatively, a voice message may be generated and transmitted containing an audio portion of the telephonic communication.

These and other features and advantages of various exemplary embodiments of systems and methods according to this disclosure are described in, or are apparent from, the following detailed description of various exemplary embodiments of the systems and methods of this subject matter.

BRIEF DESCRIPTION OF THE DRAWINGS

Various exemplary embodiments of this invention will be described in detail, with reference to the following figures, wherein like numerals represent like elements, and wherein.

DETAILED DESCRIPTION OF ILLUSTRATIVE EMBODIMENTS

The subject matter of the disclosed embodiments is described with specificity to meet statutory requirements. However, the description itself is not intended to limit the scope of this patent. Rather, the inventors have contemplated that the claimed subject matter might also be embodied in other ways, to include different steps or elements similar to the ones described in this document, in conjunction with other present or future technologies. Moreover, although the term "step" may be used herein to connote different aspects of methods employed, the term should not be interpreted as implying any particular order among or between various steps herein disclosed unless and except when the order of individual steps is explicitly described.

In the discussion that follows, details relating to telephony devices and networks are assumed to be known to those skilled in the art. Accordingly, such details are largely omitted herein for the sake of clarity and explanation. In addition, any references herein to an example embodiment involving a cellular, wireless, or mobile telephone are used solely for purposes of explanation, and are not intended to limit the invention to any such embodiment. For example, a wireless device as contemplated by various embodiments of the invention may include, but is not limited to: cellular telephones, personal digital assistants (PDAs), email devices, portable and non-portable computers, and the like. The wireless device may operate in a cellular, SMR, PCS, cordless, unlicensed AWS, 700 MHz, or other spectrums. Furthermore, embodiments are not limited by the network servicing the device. Accordingly, embodiments may be applicable to any network type including, for example, TDMA, CDMA, WCDMA, GSM, WiFi, WiMAX, OFDM, UMTS, EV-DO, HSDPA/HSUPA, and other standards now known or to be developed in the future.

Figure 1:
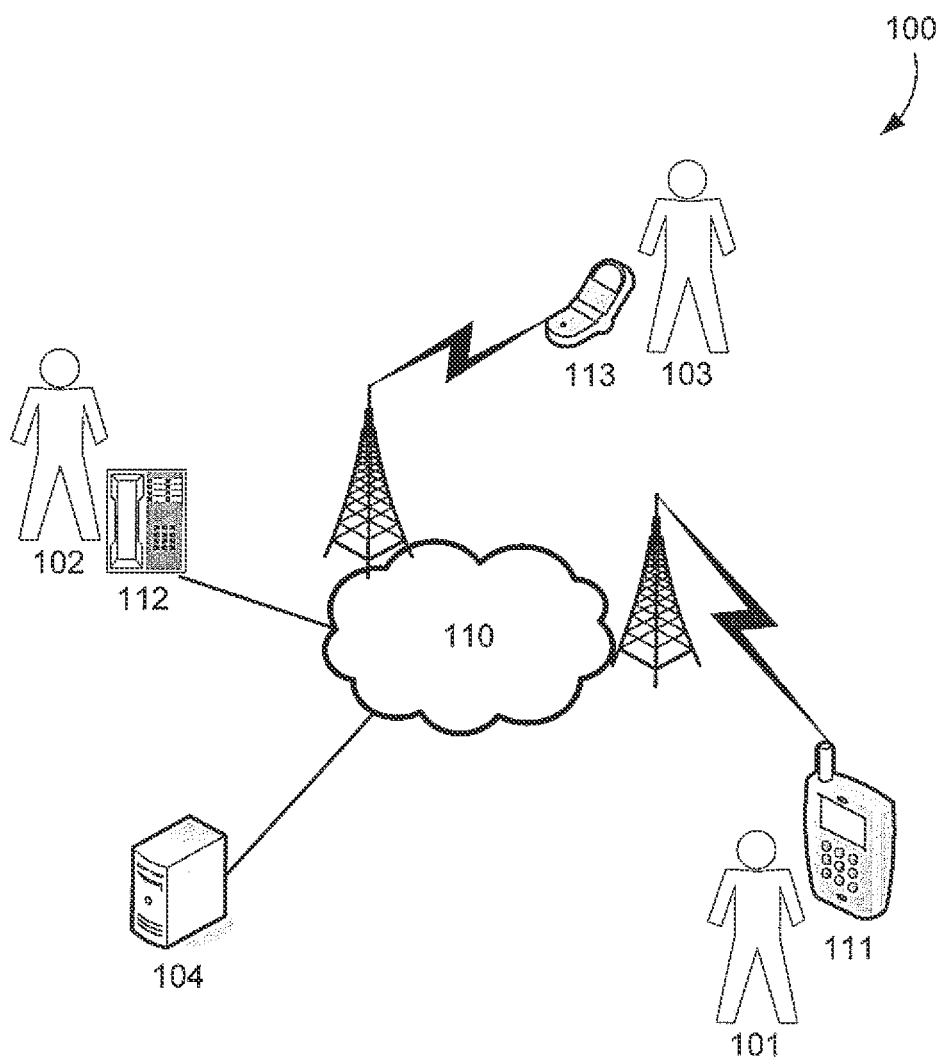
FIG. 1 is a block diagram of a non-limiting, exemplary intelligent call transcript system including communications devices, a network, and users.

FIG. 1 illustrates a system 100 including communications devices, a network, and a network device that may be in use during a telephonic communication. User 101 may be participating in a telephonic communication with users 102 and 103. This may be a three-way call, a conference call, or any other form of voice communications. It is contemplated that any number of users, including one user, may be participating in a telephonic communication with any other users and/or devices. For example, a user may be communicating with an automated system rather than one or more other users.

User 101 may be operating mobile communications device 111 as a means to participate in the telephonic communication. Mobile communications device 111 may be any type of mobile communications device as described herein, or any device capable of wirelessly facilitating telephonic communications. For example, mobile communications device 111 may be a mobile, wireless, and/or cellular telephone of any type, a personal data assistant (PDA), a laptop or other mobile computer, or any other mobile telephony-capable device.

Similarly, user 103 may be using mobile communications device 113 to participate in the telephonic communication. Mobile communications device 113 may also be any type of mobile communications device as described herein, or any device capable of wirelessly facilitating telephonic communications. For example, mobile communications device 113 may be a cellular telephone, a mobile telephone of any type, a personal data assistant (PDA), a laptop or other mobile computer, or any other mobile telephony-capable device.

User 102 may be using wired communications device 112 to participate in the telephonic communication. Wired communications device 112 may be any type of wired communications device capable of facilitating telephonic communications, including a traditional telephone, an internet protocol (IP) telephone, a digital telephone, a computer of any type configured to facilitate telephonic communications, or any other wired telephony-capable device.

Users 101, 102, and 103, through the operation of devices 111, 112, and 113, may be communicating through network 110. Network 110 may be one or more wired and/or wireless network of any type, non-limiting examples of which are described herein, or any combinations thereof. Any form of telecommunications, voice, or data network, or any combination of such networks, may be present in network 110.

Network device 104 may be communicatively connected to network 110, may be a subsystem of network 110, and may be operated, owned, and/or maintained by the operator of network 110 or by a third party. Network device 104 may or may not be geographically located in the same room, building, region, or area as other devices that make up network 110. Network device 104 may facilitate the telephonic communication between user 101, 102, and 103. Network device 104 may provide telephony services as known to those skilled in the art. For example, network device 104 may function as a private branch exchange (PBX). In one embodiment, network device 104 provides intelligent call transcription services as described herein.

Network device 104 may be configured to transcribe the telephonic communication between users 101, 102, and 103. Network device 104 may use any transcription method or means that can convert the spoken words or other sounds detected in the telephonic communication into text. Any automated or computerized speech recognition system, means, or methods may be employed to transcribe the telephonic communication. Network device 104 may also be configured to perform other network tasks, or may be configured only for intelligent transcription of telephonic communications. Transcription may be performed using any means known to those skilled in the art, and may be performed by default, for example when used in conjunction with a conference call system, or may be perform at the instruction of a user or device. The transcribed telephonic communication may be provided in any form of transcript, including electronic documents and other electronic forms of text presentation. Such electronic transcripts may include software and data that allow a user, device, or software to manipulate, alter, and/or perform further processing on the transcript. Electronic versions of the transcript may also integrate software and/or data such that the transcript itself is an executable software application.

In addition to transcribing the telephonic communication, network device 104 may record and/or store the communication on one or more computer storage devices, such as a hard disk drive or random access memory, and/or on magnetic or digital tape, disks, or other media, or any other effective recording or storage means. If the telephonic communication is stored in some manner, transcription may be performed before, during, or after the telephonic communication is stored.

Network device 104 may also be configured to accept instructions and/or commands from users and/or other network devices directly and/or through network 110. Such instructions may be received through one or more interfaces, such as a web page, an application, or an application programming interface. These interfaces may be used in conjunction with other devices and/or software that allow a user and/or another device to issue instructions to network device 104. Instructions may also be transmitted to network device 104 through the use of tone generated by a telephone, such as dual-tone multi-frequency (DTMF) tones. Instructions may also be detected by network device 104 through voice or speech recognition. Instructions may also be detected or received by one or more other devices that, responsive to receiving or detecting the instruction, transmit one or more instructions to network device 104. In some embodiments, network device may only accept or recognize instructions from approved or designated users or devices. For example, a designated chairperson in a conference call may be the only user permitted to instruct network device 104 to begin transcribing a telephonic communication. All other means and methods of issuing and receiving instructions on a device and all other methods and means of restricting the ability of users and devices to issue instructions to a device are contemplated as within the scope of the present disclosure.

In one embodiment, network device 104 transcribes the entire telephonic communication. In an alternative embodiment, network device 104 may transcribe only a portion of the telephonic communication. Network device 104 may receive a command or instruction from a user or device instructing network device 104 when to begin and/or when to stop transcribing a telephonic communication. For example, user 101 may operate mobile communications device 111 by pressing a key on a key pad of mobile communications device 111, sending a tone to network 110. Network 110 may transmit this tone to network device 104, which may be configured to recognize such tones and perform actions in response to such tones. Alternatively, network 110 and/or one or more devices within network 110 may be configured to detect such tones and, in response to detecting the tone, transmit an instruction or command to network device 104.

In another alternative, network device 104 may be configured to detect certain voice commands or speech that network device 104 may interpret as a command or instructions. For example, user 101 may say "begin transcription" during the telephonic communication, which network device 104 may recognize as a command and begin transcription. Alternatively, network 110 and/or one or more devices within network 110 may be configured to detect such voice commands and, in response to detecting the voice command, transmit an instruction or command to network device 104.

In one embodiment, a command may be received or detected that instructs network device 104 to stream the transcript as it is created to one or more designated or default devices or users. Such a feature may be helpful to those users who are in an area where listening to a conversation is difficult, such as an area with loud noise present or where absolute silence is requires. In such an embodiment, the transcript may be streamed as it is created, or the transcript may be streamed at a point in the future for later reference. Other embodiments of streaming transcripts are contemplated.

In still another alternative, network device 104 may receive instructions to begin and/or end transcription through an interface. For example, user 103 may operate a web browser on mobile communications device 113, or on a separate device, which displays a web interface to network device 104, or to another device that is communicatively connected to network device 104. This interface may allow user 103 to instruct network device 104 to begin transcribing the telephonic communication. In another embodiment, network device 104 may receive an instruction to enter a mode in which instructions are received regarding transcription commands. For example, a user may send a tone command to network device 104 by pressing the '*' key. Network device 104 may recognize this as an instruction to enter transcription command mode. Thereafter, network device 104 may begin recognizing command or instructions, such as voice commands, that affect call transcription. All other means or methods of instructing network device 104 to begin and/or end transcription of a telephonic communication, and all other means and methods of instructing network device 104 when and if to accept transcription commands, are contemplated as within the scope of the present disclosure.

In one embodiment, network device 104 may record, or store, the telephonic communication during, before, or after the transcription. In another embodiment, network device 104 may maintain a temporary recording of the telephonic communication as it is ongoing, in a buffer or similar storage means, and move the temporarily stored telephonic communication to permanent storage upon instruction received from a user, administrator, or device. In some embodiments, network device 104 may maintain the entire telephonic communication in a buffer. In other embodiments, network device 104 may maintain only a preconfigured amount of the telephonic communication in a buffer, for example the most recent ten minutes, allowing a user to direct network device 104 to move the buffered amount of the telephonic communication to permanent storage as desired. Other means and methods of selecting or directing portions or the entirety of a telephonic communication to be stored permanently are contemplated as within the scope of the present disclosure.

Network device 104 may correlate the transcribed text with the recording time of the recorded telephonic communication and insert one or more tags into the transcript based on the recording time. Such tags may be links, hyperlinks, data, metadata, or any other indicator or software construct that connects or references the audio recording of the telephonic communication. For example, as described in more detail below, network device 104 may include in the transcript a tag associated with each, or selected, words in the transcript. Alternatively, network device 104 may label sentences, words, or portions of the transcript, and associate a tag with each label. For example, network device 104 may identify each speaker in the telephonic communication and add the speaker's name or other identifier to the transcript. Network device 104 may create and associate a tag with each name or identifier. Other items within a transcript may have tags associated with them, and all such items are contemplated as within the scope of the present disclosure.

The tag associated with a word, name, identifier, etc., may serve as a connector to an audio recording of the telephonic communication. The audio recording may be a separate file apart from the transcript, or it may be embedded, integrated, or otherwise included within the transcript. When such a tag is activated, it may initiate the playing of the audio recording. Such playing may include the launching of an application to play audio files. Activation of the tag may instruct the audio recording, or a related application, to start playing the recording at the time that the word with which the tag is associated was spoken in the telephonic communication. Alternatively, the recording or its associated application may be instructed to begin playing the recording at a predetermined amount of time before or after the time that the word with which the tag is associated was spoken in the telephonic communication. For example, if a user of the transcript clicks on a tag associated with the word "budget", the audio recording or its associated application may be instructed to play the audio recording starting ten seconds before that instance of the word "budget" was said in the telephonic communication. The timing of when to start playing the audio recording of a telephonic communication in relation to when the selected word was said may be configured by a user or another device, and may be adjustable at any point during the telephonic communication or during the use of the transcript.

Alternatively, the recording or its associated application may be instructed to begin playing the recording at a predetermined point before or after the time that the word with which the tag is associated was spoken in the telephonic communication. For example, if a user of the transcript clicks on a tag associated with the word "budget", the audio recording or its associated application may be instructed to play the audio recording starting at the sentence in which that instance of the word "budget" was said in the telephonic communication. In yet another alternative, the audio recording or its associated application may be instructed to play the audio recording at the point when the speaker who said that instance of the word "budget" most recently started speaking in the telephonic communication. For example, if a user of the transcript clicks on a tag associated with the word "budget", the audio recording or its associated application may be instructed to play the audio recording starting at the point where the speaker of that instance of the word "budget" began talking before the speaker spoke that particular instance of the word "budget" in the telephonic communication.

In some embodiments, network device 104 may detect specific words or commands and take actions based on the detection. In one embodiment, a command may be sent to network device 104 during the telephonic communication that instructs network device 104 to insert an indicator into the transcript. User 101 may send a tone to network device 104 (or to an intermediate device that translates the tone into a command) that instructs network device 104 to mark a portion of the text in a certain manner. Network device 104 may be instructed to add highlighting to a portion of the transcript. Alternatively, network device 104 may be instructed to add text, markings, or other indicators to the transcript. For example, user 101 may be given an action item during a conference call, and may press "*1" to generate an instruction to network device 104 to mark the action item in the transcript. Network device 104 may then mark a portion of the transcript, such as highlighting the text associated with the last 30 seconds of the telephonic communication before receiving the instruction. Alternatively, network device 104 may insert the words "ACTION ITEM" into the transcript in a manner that makes locating the action item within the transcript easier.

In another embodiment, network device 104 may detect certain words or sounds within the telephonic communication and, responsive to detecting the certain words or sounds, insert an indicator into the transcript. For example, network device 104 may detect the words "action item" when said by a participant in the telephonic communication and mark the text associated with a period of time before and/or after the detection of the words "action item". In yet another alternative, network device 104 may be instructed through an interface, such as a software application or a web page, to mark certain portions of the transcribed telephonic communication. All other means and methods of instructing network device 104 to mark a portion of a transcript, and any markings, indicia, highlighting or any other means or methods of identifying a portion of a transcript may be used. All such means and methods are contemplated as within the scope of the present disclosure.

In other embodiments, actions may be taken to communicate a portion or the entirety of the transcript to one or more users or devices. In one embodiment, network device 104 may detect specific words or commands and create a text message or email message and transmit the message to a user. Network device 104 may include in the message a portion of the transcribed telephonic communication. For example, after detecting a voice, tone, or other form of command, or after receiving a command through an interface, network device 104 may include in a message the transcribed portions of the telephonic communication that correspond to time periods of the telephonic communication before, during, and/or after the command was detected or received. The time periods may be predetermined and configured by an administrator, user or device. Alternatively, a specification of the time period to be captured in the transcript portion included in the message may be specified by the user or device issuing the command.

In another embodiment, actions may be taken to communicate an audio portion or the entirety of the recorded telephonic communication to one or more users or devices as a voice message. Such a voice message may be sent to a participant in the telephonic communication, or to another party who may be interested in the substance of the communication. Such a voice message may be sent to a telephony device, such as a phone or voicemail box, or may be attached to or otherwise included with a message such as an email or text message. In one embodiment, network device 104 may detect specific words or commands and create a clip of a recording of the telephonic transcript and transmit the clip to a user. Network device 104 may include with the clip a description of telephonic communication, such as a time, date, user names, or other identifying information. For example, after detecting a voice, tone, or other form of command, or after receiving a command through an interface, network device 104 may transmit one more portions of the recorded telephonic communication that correspond to time periods of the telephonic communication before, during, and/or after the command was detected or received. The time periods may be predetermined and configured by an administrator, user or device. Alternatively, a specification of the time period of the recorded telephonic communication to be captured may be specified by the user or device issuing the command. Other means and methods of determining the portion of the telephonic communication to be sent in a voice message are contemplated as within the scope of the present disclosure.

In another embodiment, actions may be taken to add information to the transcript. In one alternative, words may be detected by network device 104 using voice or speech recognition technology and additional information may be added based on the detection of the words. In another embodiment, a command may be received or detected by network device 104 instructing network device 104 collect and/or provide additional information in the transcript about the word or words detected. For example, an acronym may be detected, such as "IP", and network device 104 may integrate the meaning of the acronym into the transcript, such as adding "[internet protocol]" following the transcription of "IP". Alternatively, after a user hears the acronym "IP" during the telephonic communication, the user may issue a command through any of the means described herein instructing network device 104 to provide the meaning of the acronym "IP" in the transcript.

Alternatively, network device 104 may add other information or links to information about detected words. For example, if network device 104 detects the word "BigCo", or is instructed to provide information about the word "BigCo" after it is detected in the telephonic communication, network device 104 may insert into the transcript, in one embodiment at or near the word "BigCo", a hyperlink to BigCo's website, a hyperlink to recent news stories about BigCo, a listing of BigCo's most recent stock price, a report generated by a participant about BigCo, and/or any other information that may be available. Any type of information or connection or link to such information may be provided.

In another embodiment, network device 104 may detect foreign language words and automatically provide a translation for such words. Alternatively, network device 104 may be instructed to provide a translation of such words by a user using any of the command methods and means described herein. For example, network device 104 may detect the words "merci beaucoup", or may be instructed to provide a translation of the words ""merci beaucoup" after it is detected in the telephonic communication. Network device 104 may insert into the transcript, in one embodiment at or near the words "merci beaucoup", "[thank you very much]".

In yet another embodiment, the tone or emotional content of the words spoken may be detected and actions taken based on the detection. For example, if a speaker is particularly happy-sounding, which may be determined using voice and/or speech recognition technology, network device 104 may insert into the transcript, in one embodiment at or near the happy-sounding words, an emoticon or other indicator of the happy emotion associated with the words. This additional information may be helpful to a reader of the transcript who was not present during the telephonic communication to get the full meaning of the words spoken.

In still another embodiment, a picture or video of the speaker may be included in the transcript. Speakers may be identified in any number of ways, including by a log-in used to enter into the telephonic communication, voice detection and identification, or any other effective means. Network device 104 may, after identifying the speaker, insert a picture of the speaker obtained from any available source. Alternatively, as is more common, the telephonic communication may also be a video communication, with video available of one or more of the participants. Video clips of the speakers as they spoke the words in the transcript may be included with the transcript, in one embodiment at or near the words spoken. Alternatively, video of other participants in the telephonic communication may be included with the words spoken by a participant, in one embodiment at or near the words spoken, so that a user of transcript can see the reactions of the other participants as the words are spoken. The types of information and/or the method of presenting the information may be configured by a user, administrator, or device, and/or may be specified in a command instructing network device 104 to provide the information. All such means and methods are contemplated as within the scope of the present disclosure.

Figure 2A:
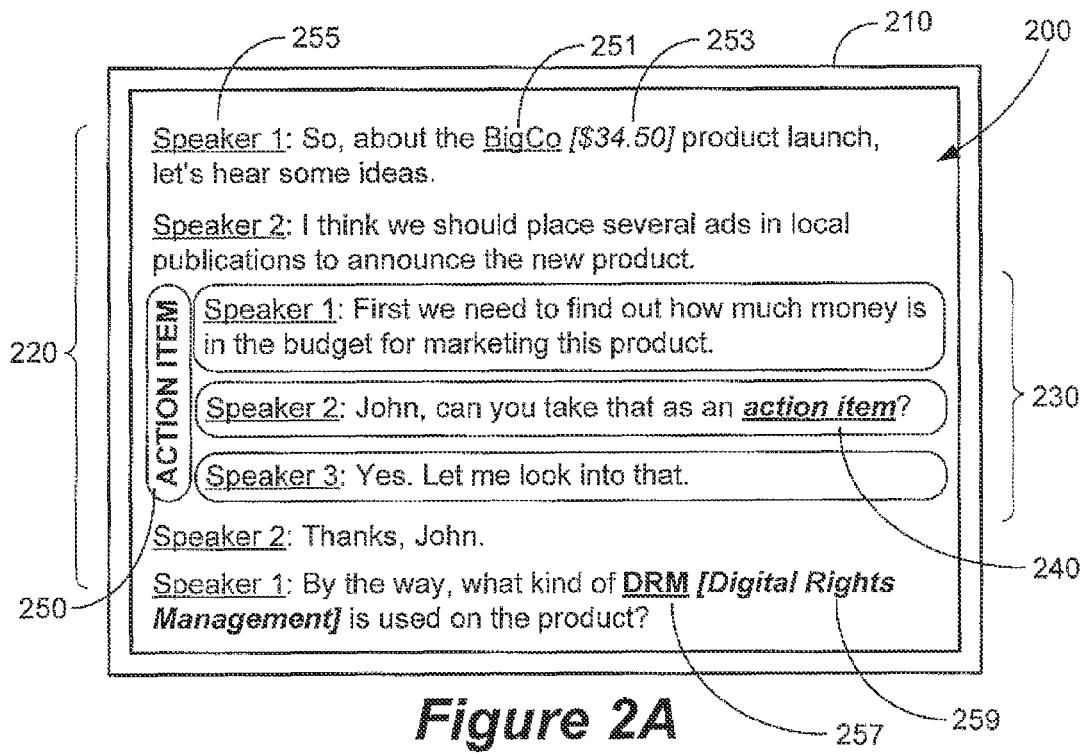
FIG. 2A is an illustration of a non-limiting, exemplary embodiment of an intelligent call transcript.

FIG. 2A illustrates a non-limiting, exemplary transcript 200, displayed on display 210. Transcript 200 may be a software or data version of a transcript. Transcript 200 may be generated using any of the means described herein, or any other effective means. Display 210 may be a computer monitor, television, PDA display, mobile device display, or any other type of display capable of displaying text.

Transcript 200 includes lines of text 220 that represent a transcribed portion of a telephonic communication. Transcript 200 may set out each speaker's words separately. Each speaker may be identified by a label, such as label 255 that identifies Speaker 1. The labels identifying speakers may also contain tags or links to audio portions of the telephonic communication as described above. Each word, or selected words, within the transcript may also contain links or tags to audio portions of the telephonic communication as described above.

Words within the telephonic communication may be detected and actions taken in response. Alternatively, commands may be issued to an intelligent call transcript system instructing the system to take actions based on detected words. For example, key words 240, in this example comprising "action item", may be detected by an intelligent call transcript system. The intelligent call transcript system may, responsive to this detection, highlight lines 230 that are proximate to key words 240. Key words 240 may themselves be highlighted or otherwise identified. In addition to, or instead of, the highlighting, the intelligent call transcript system may add a tag, identifier, or other indicator, such as identifier 250, to the transcript to identify the key words and/or the words or content proximate to the key words. Any type of identifier, tag, or other means of making a portion of transcript 200 stand out are contemplated as within the scope of the present disclosure.

In one embodiment, an abridged version of a transcript may be generated with only selected text versions of portions of the telephonic communication present, along with, in one embodiment, tags or other additional information. For example, transcript 200 may only contain the text associated with the portions of the telephonic communication that are associated with a key word or words, such as "action item". Other means and methods of producing an abridged transcript are contemplated as within the scope of the present disclosure.

In another embodiment, other information may be included based on detected words, or at the instruction of a user or device. Key word 251, in this example comprising the word "BigCo", may be associated with a link that, when activated, connects the user to a web site, news source, or other construct that provides more information about key word 251 or other subjects. Alternatively, when key words 240 are detected, a link may be created that, when activated, generates a message, such as an email or text message, transmitting the portion of the transcript, such as lines 230, to a user or device. The detection of key words, such as key word 251, may also instruct intelligent call transcript system to insert additional information into the transcript, such as additional information 253, in this example comprising the stock price of BigCo stock. Any other useful information, such as a translation of a detected foreign word, may be provided.

In another embodiment, acronyms may be expanded to provide their full meanings within the transcript. For example, acronym 257, in this example comprising the acronym "DRM", may be detected and additional information 259, in this example comprising "Digital Rights Management", may be added to the transcript, in one embodiment at or proximate to detected acronym 257 or in another embodiment, compiled with other acronyms to form a glossary of acronyms. Any other methods and means of detecting words or receiving instructions to take actions based on detected or transcribed words may be used, as may any other means or methods of taking actions. All such means and methods are contemplated as within the scope of the present disclosure.

Figure 2B:
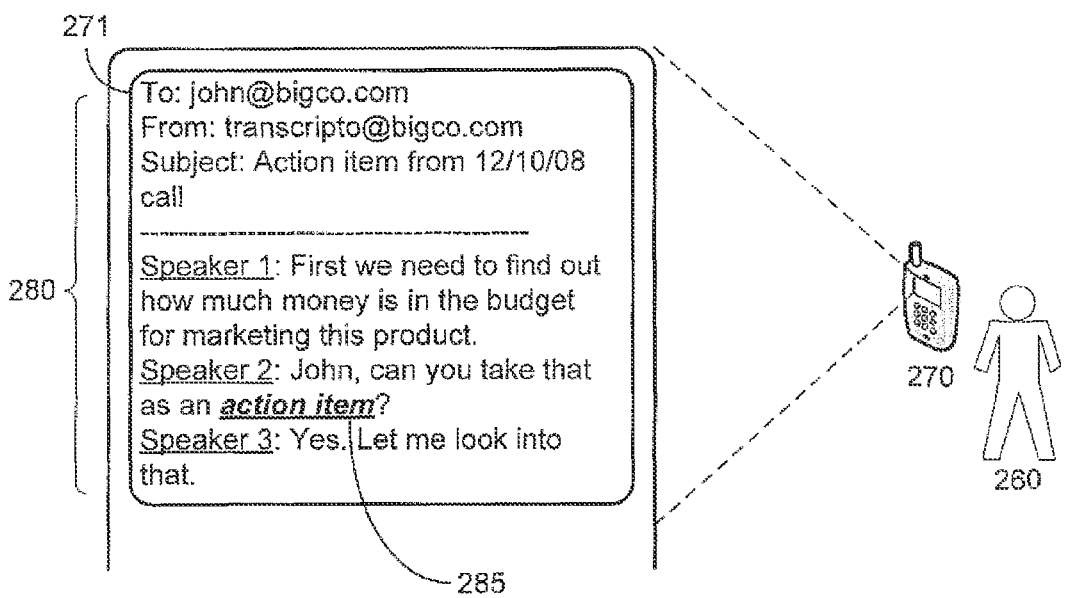
FIG. 2B is an illustration of another non-limiting, exemplary embodiment of an intelligent call transcript sent as a message.

In some embodiments, an intelligent call transcript system may transmit portions of a transcript to users upon instruction by a user or device, or upon detection of one or more words or sounds. For example, when key words 240 are detected, the intelligent call transcript system may generate message 280 shown in FIG. 2B. User 260 may receive the message on mobile communications device 270, and may view the message on display 271 of mobile communications device 270. Message 280 may be an email, a text message, or any other form of text content. Message 280 may also include the name of the recipient, an identifier of the sender and/or requestor of the message, a subject line, and/or any other information that may be available. Message 280 may also include additional information provided by an intelligent call transcript system, such as linked words 285. Linked words 285 may include a link that, when activated by user 260, plays an audio clip of the portion of the telephonic communication captured in message 280, plays video of one or more of the speakers, connects user 260 to a web page or other software construct that may contain additional information, or provide any other information or connections. All such embodiments are contemplated as within the scope of the present disclosure.

Figure 3:
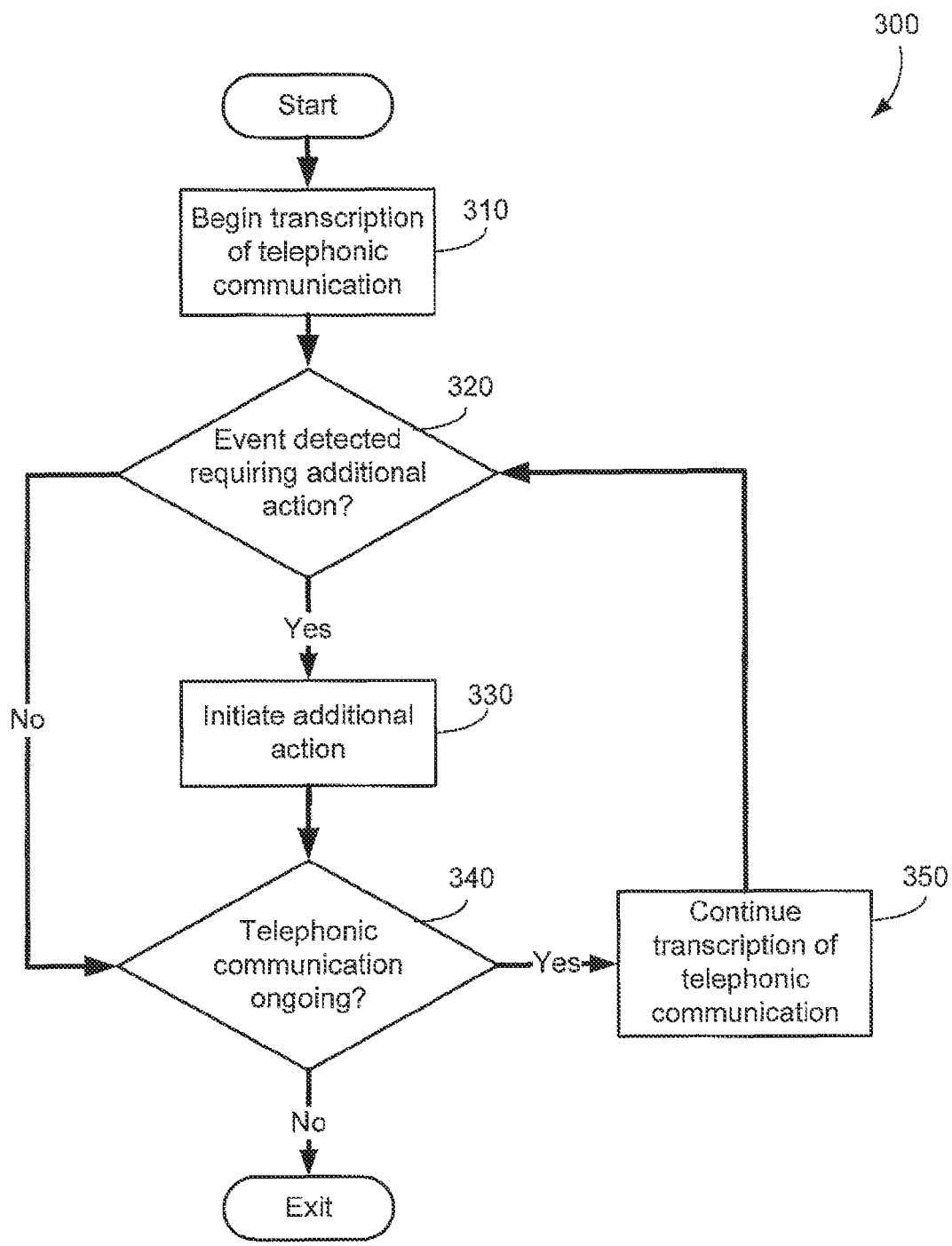
FIG. 3 is a flow chart of non-limiting, exemplary method of implementing an intelligent call transcript system.

FIG. 3 illustrates a non-limiting, exemplary method 300 of implementing an intelligent call transcript system. At block 310, transcription of a telephonic communication is started. While the transcription is progressing, at block 320, the intelligent call transcript system may detect events that require or instruct the intelligent call transcript system to take actions. For example, the intelligent call transcript system may detect a key word or words that indicate certain steps are to be taken, such as inserted the meaning of an acronym, the translation of a key word, an emoticon, a link or tag, or other additional information or data into the transcript. Alternatively, the intelligent call transcript system may detect or receive a command or instruction from a user, administrator, or other device that instructs the intelligent call transcript system to take an action. Any type of event or instruction that can be detected or received by an intelligent call transcript system is contemplated as within the scope of the present disclosure.

If, at block 320, no event is detected, at block 340 it is determined whether the telephonic communication is ongoing. If so, transcription is continued at block 350. The determination made at block 340 may also include determining if an instruction, command, or event has been detected or received that instructs the intelligent call transcript system to stop transcribing the telephonic communication. If an event indicating that the intelligent call transcript system should stop transcribing is detected, or if it is determined at block 340 that the telephonic communication is not ongoing, then the method is exited.

Returning to block 320, if an event is detected that indicates to the intelligent call transcript system that an action should be taken, the action is taken, or initiated, at block 330. The action may be any type of action as described herein, such as translating a word or words, expanding on an acronym, adding identifiers, links, tags, highlighting, pictures, emoticon, and/or video to the transcript, transmitting an audio, video, or text portion of the transcript to a user, terminating the telephonic communication, and/or any other type of action. All such actions are contemplated as within the scope of the present disclosure.

After initiating the action at block 330, at block 340 the determination is made as to whether the telephonic communication is ongoing. If so, at block 350 the transcription continues. If the telephonic communication has been terminated, the method is exited.

In one embodiment, the intelligent call transcript systems, methods, and features described above may be implemented on a user device, such as mobile communications device 111, 113, or 270, or wired communications device 112, rather than, or in addition to, a network device such as network device 104. Alternatively, network device 104 may be a component or subsystem of a communications device, such as mobile communications devices 111, 113, or 270, or wired communications device 112. Thus, the functions and features described herein may be performed on a communications device, such as transcribing and/or recording telephonic communications, receiving commands and/or instructions affecting the configuration and control of an intelligent call transcript system, and transmitting and/or receiving transcribed and/or recorded telephonic communication data. All such embodiments, and any embodiments combining wired and/or mobile communications devices and network devices, are contemplated as within the scope of the present disclosure.

Note also that any of the methods, systems, and means described herein may be used for any type of audible or audio data and with any technology. For example, rather than telephonic communications, the methods and means recited herein may be applied to any type of conversation, such as those in a recorded medium or those recorded without the participation of the user requesting the recording. Note also that the intelligent call transcript system as described herein may be integrated into other telephony or communications related systems and devices, such as a conference call system, a wireless or wireline communications system, or any other type of communications system or device. All such embodiments are contemplated as within the scope of the present disclosure.

Figure 4:
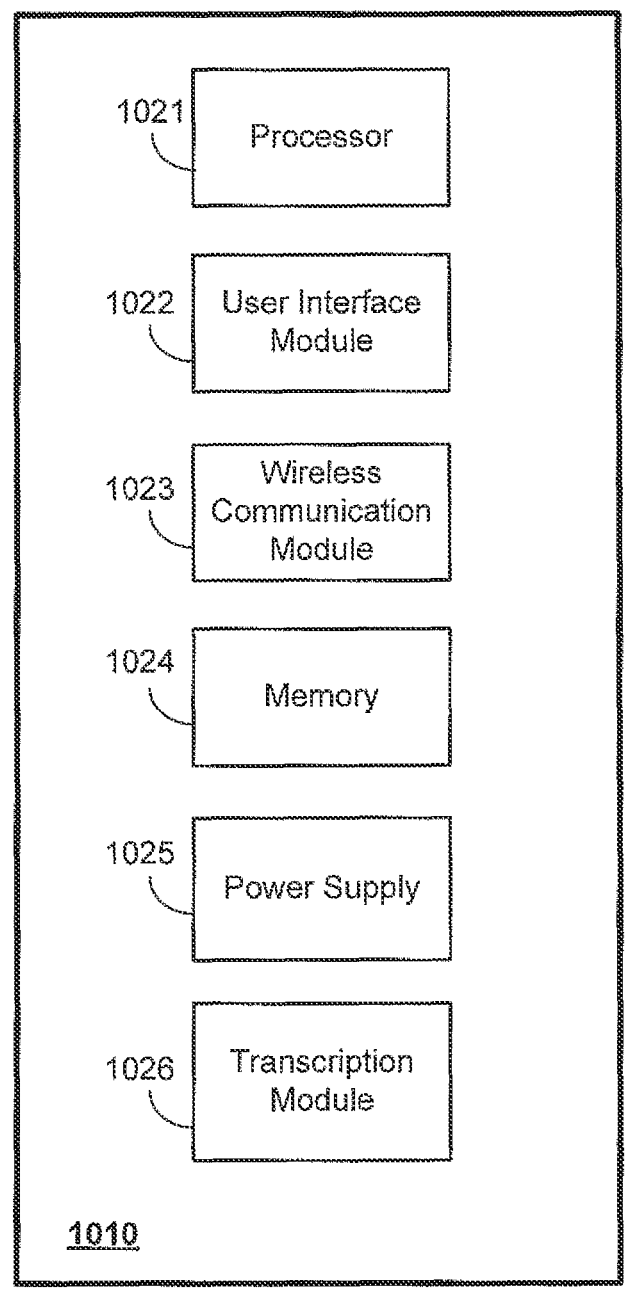
FIG. 4 is a block diagram of a non-limiting, exemplary wireless device that may be used in connection with an embodiment.

FIG. 4 illustrates an example wireless device 1010 that may be used in connection with an embodiment. References will also be made to other figures of the present disclosure as appropriate. For example, mobile communications devices 111, 113, and 270 may each be a wireless device of the type described in regard to FIG. 4, and may have some, all, or none of the components and modules described in regard to FIG. 4. It will be appreciated that the components and modules of wireless device 1010 illustrated in FIG. 4 are illustrative, and that any number and type of components and/or modules may be present in wireless device 1010. In addition, the functions performed by any or all of the components and modules illustrated in FIG. 4 may be performed by any number of physical components. Thus, it is possible that in some embodiments the functionality of more than one component and/or module illustrated in FIG. 4 may be performed by any number or types of hardware and/or software.

Processor 1021 may be any type of circuitry that performs operations on behalf of wireless device 1010. In one embodiment, processor 1021 executes software (i.e., computer readable instructions stored in a computer readable medium) that may include functionality related to intelligent transcription of telephonic communications, communicating with, operating, or interfacing with an intelligent call transcript system, and/or running software configured to operate, communicate, or interface with an intelligent call transcript system, for example. User interface module 1022 may be any type or combination of hardware and/or software that enables a user to operate and interact with wireless device 1010, and, in one embodiment, to interact with an intelligent call transcript system. For example, user interface module 1022 may include a display, physical and "soft" keys, voice and/or speech recognition software, microphone, speaker and the like. Wireless communication module 1023 may be any type or combination of hardware and/or software that enables wireless device 1010 to communicate with, for example, network 110 or any other type of wireless communications network. Memory 1024 enables wireless device 1010 to store information, recorded and/or transcribed telephonic communication and additional related data, voice and/or speech recognition software, transcription software, a web browser, or the like. Memory 1024 may take any form, such as internal random access memory (RAM), an SD card, a microSD card and the like. Power supply 1025 may be a battery or other type of power input (e.g., a charging cable that is connected to an electrical outlet, etc.) that is capable of powering wireless device 1010.

Transcription module 1026 may be any type or combination of hardware and/or software that enables wireless device 1010 to intelligently transcribe telephonic communications. In one embodiment, processor 1021 may perform the functions of transcription module 1026. In an alternative embodiment, transcription module 1026 may be separate from processor 1023.

Figure 5:
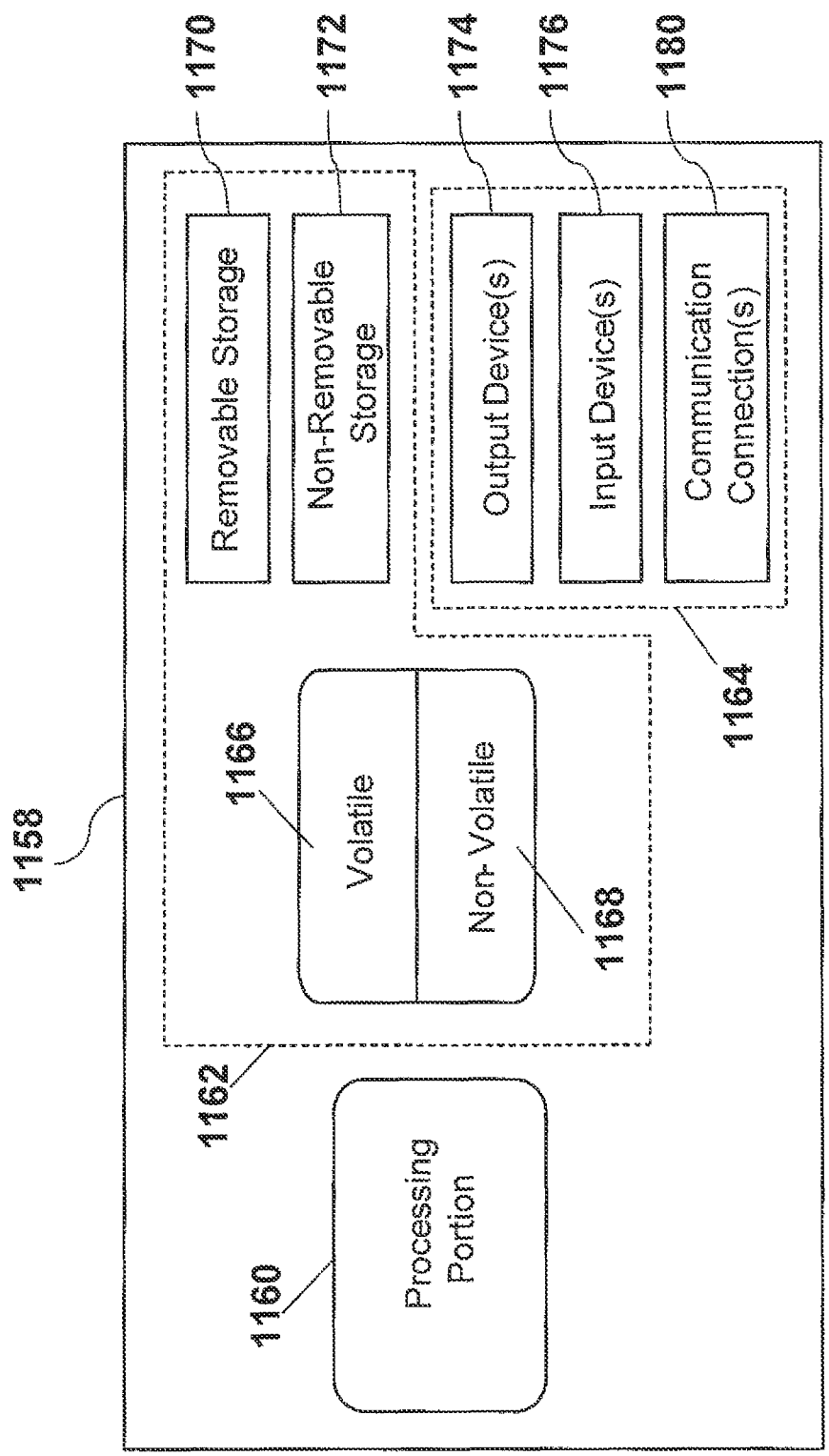
FIG. 5 is a block diagram of a non-limiting, exemplary processor in which the present subject matter may be implemented.

FIG. 5 is a block diagram of an example processor 1158 which may be employed in any of the embodiments described herein, including as one or more components of mobile communications devices 111,113, or 270, or wired communications device 112, or as one or more components of communications network equipment or related equipment, such as any component of network 110, and/or as one or more components of any third party system or subsystem that may implement any portion of the subject matter described herein, such as network device 104. It is emphasized that the block diagram depicted in FIG. 5 is exemplary and not intended to imply a specific implementation. Thus, the processor 1158 can be implemented in a single processor or multiple processors. Multiple processors can be distributed or centrally located. Multiple processors can communicate wirelessly, via hard wire, or a combination thereof.

The processor 1158 comprises a processing portion 1160, a memory portion 1162, and an input/output portion 1164. The processing portion 560, memory portion 562, and input/output portion 1164 are coupled together (coupling not shown in FIG. 5) to allow communications between these portions. The input/output portion 1164 is capable of providing and/or receiving components, commands, and/or instructions, utilized to, for example, operate an intelligent call transcript system or any subsystem or component thereof.

The processor 1158 can be implemented as a client processor and/or a server processor. In a basic configuration, the processor 1158 may include at least one processing portion 1160 and memory portion 1162. The memory portion 1162 can store any information utilized in conjunction with transmitting, receiving, and/or processing intelligent transcription instructions or commands, intelligent transcription applications, telephonic communications, transcripts of telephonic communication, recorded telephonic communications, etc. For example, as described above, the memory portion is capable of storing transcripts, recorded telephonic communications, and/or software capable of operating an intelligent call transcript system. Depending upon the exact configuration and type of processor, the memory portion 1162 can be volatile (such as RAM) 1166, non-volatile (such as ROM, flash memory, etc.) 1168, or a combination thereof. The processor 1158 can have additional features/functionality. For example, the processor 1158 can include additional storage (removable storage 1170 and/or non-removable storage 1172) including, but not limited to, magnetic or optical disks, tape, flash, smart cards or a combination thereof. Computer storage media, such as memory and storage elements 1162, 1170, 1172, 1166, and 1168, include volatile and nonvolatile, removable and non-removable media implemented in any method or technology for storage of information such as computer readable instructions, data structures, program modules, or other data. Computer storage media include, but are not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, universal serial bus (USB) compatible memory, smart cards, or any other medium which can be used to store the desired information and which can be accessed by the processor 1158. Any such computer storage media may be part of the processor 1158.

The processor 1158 can also contain the communications connection(s) 1180 that allow the processor 1158 to communicate with other devices, for example through network 110. Communications connection(s) 1180 is an example of communication media. Communication media typically embody computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection as might be used with a land line telephone, and wireless media such as acoustic, RF, infrared, cellular, and other wireless media. The term computer-readable media as used herein includes both storage media and communication media. The processor 1158 also can have input device(s) 1176 such as keyboard, keypad, mouse, pen, voice input device, touch input device, etc. Output device(s) 1174 such as a display, speakers, printer, etc. also can be included.

Network 110 may comprise any appropriate telephony radio network, or any other type of communications network, wireline or wireless, or any combination thereof. The following description sets forth some exemplary telephony radio networks, such as the global system for mobile communications (GSM), and non-limiting operating environments. The below-described operating environments should be considered non-exhaustive, however, and thus the below-described network architectures merely show how IP cellular broadcast may be used with stationary and non-stationary network structures and architectures. It can be appreciated, however, that intelligent call transcript systems such as those described herein can be incorporated with existing and/or future alternative architectures for communication networks as well.

The GSM is one of the most widely utilized wireless access systems in today's fast growing communication environment. The GSM provides circuit-switched data services to subscribers, such as mobile telephone or computer users. The General Packet Radio Service (GPRS), which is an extension to GSM technology, introduces packet switching to GSM networks. The GPRS uses a packet-based wireless communication technology to transfer high and low speed data and signaling in an efficient manner. The GPRS attempts to optimize the use of network and radio resources, thus enabling the cost effective and efficient use of GSM network resources for packet mode applications.

As one of ordinary skill in the art can appreciate, the exemplary GSM/GPRS environment and services described herein also can be extended to 3G services, such as Universal Mobile Telephone System (UMTS), Frequency Division Duplexing (FDD) and Time Division Duplexing (TDD), High Speed Packet Data Access (HSPDA), cdma2000 1x Evolution Data Optimized (EVDO), Code Division Multiple Access-2000 (cdma2000 3x), Time Division Synchronous Code Division Multiple Access (TD-SCDMA), Wideband Code Division Multiple Access (WCDMA), Enhanced Data GSM Environment (EDGE), International Mobile Telecommunications-2000 (IMT-2000), Digital Enhanced Cordless Telecommunications (DECT), 4G Services such as Long Term Evolution (LTE), etc., as well as to other network services that become available in time. In this regard, the systems and methods of an intelligent call transcript system can be applied independently of the method of data transport, and do not depend on any particular network architecture, or underlying protocols.

Figure 6:
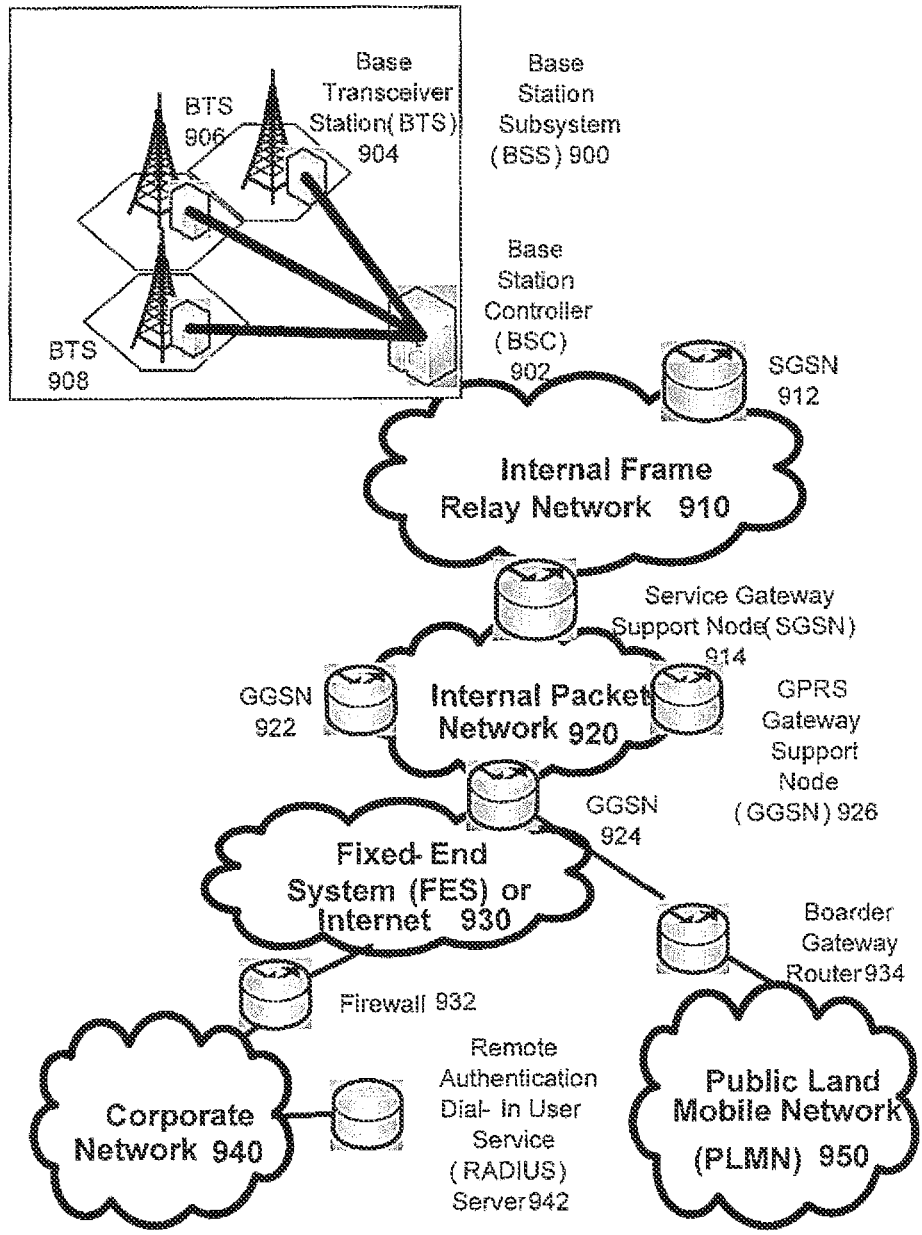
FIG. 6 is an overall block diagram of an exemplary packet-based mobile cellular network environment, such as a GPRS network, in which the present subject matter may be implemented.

FIG. 6 depicts an overall block diagram of an exemplary packet-based mobile cellular network environment, such as a GPRS network, in which intelligent call transcript systems such as those described herein can be practiced. In an example configuration, network 110 may be encompassed by the network environment depicted in FIG. 6. In such an environment, there may be a plurality of Base Station Subsystems (BSS) 900 (only one is shown), each of which comprises a Base Station Controller (BSC) 902 serving a plurality of Base Transceiver Stations (BTS) such as BTSs 904, 906, and 908. BTSs 904, 906, 908, etc. are the access points where users of packet-based mobile devices (e.g., mobile communications device 111 or 113) become connected to the wireless network. In exemplary fashion, the packet traffic originating from user devices (e.g., mobile communications devices 111 and 113) may be transported via an over-the-air interface to a BTS 908, and from the BTS 908 to the BSC 902. Base station subsystems, such as BSS 900, may be a part of internal frame relay network 910 that can include Service GPRS Support Nodes (SGSN) such as SGSN 912 and 914. Each SGSN may be connected to an internal packet network 920 through which a SGSN 912, 914, etc. may route data packets to and from a plurality of gateway GPRS support nodes (GGSN) 922, 924, 926, etc. As illustrated, SGSN 914 and GGSNs 922, 924, and 926 may be part of internal packet network 920. Gateway GPRS serving nodes 922, 924 and 926 may provide an interface to external Internet Protocol (IP) networks, such as Public Land Mobile Network (PLMN) 950, corporate intranets 940, or Fixed-End System (FES) or the public Internet 930. As illustrated, subscriber corporate network 940 may be connected to GGSN 924 via firewall 932; and PLMN 950 may be connected to GGSN 924 via border gateway router 934. The Remote Authentication Dial-In User Service (RADIUS) server 942 may be used for caller authentication when a user of a mobile cellular device calls corporate network 940.

Generally, there can be four different cell sizes in a GSM network, referred to as macro, micro, pico, and umbrella cells. The coverage area of each cell is different in different environments. Macro cells may be regarded as cells in which the base station antenna is installed in a mast or a building above average roof top level. Micro cells are cells whose antenna height is under average roof top level. Micro-cells may be typically used in urban areas. Pico cells are small cells having a diameter of a few dozen meters. Pico cells may be used mainly indoors. On the other hand, umbrella cells may be used to cover shadowed regions of smaller cells and fill in gaps in coverage between those cells.

Figure 7:
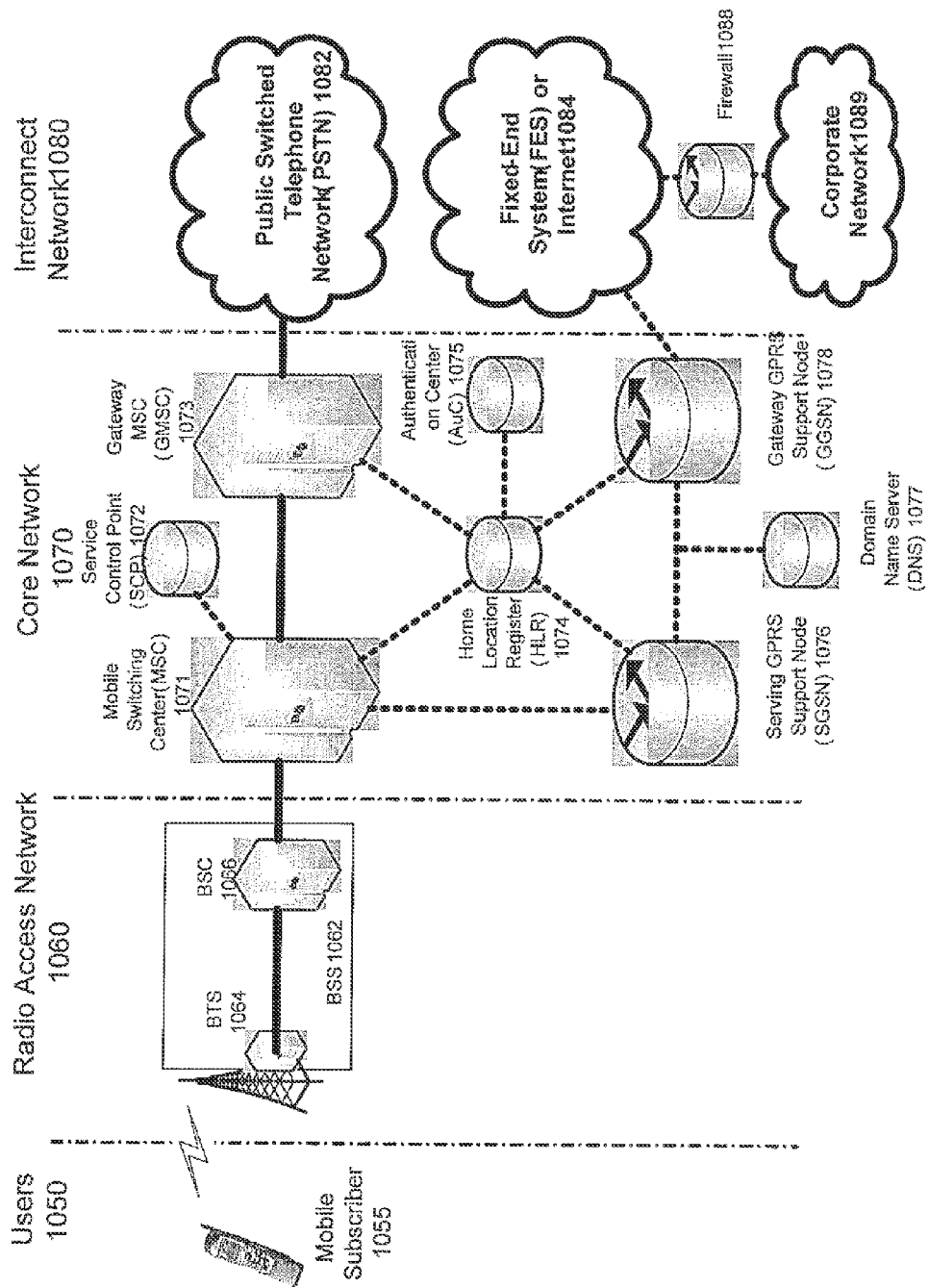
FIG. 7 illustrates a non-limiting, exemplary architecture of a typical GPRS network as segmented into four groups.

FIG. 7 illustrates an architecture of a typical GPRS network segmented into four groups: users 1050, radio access network 1060, core network 1070, and interconnect network 1080. Users 1050 may comprise a plurality of end users (though only mobile subscriber 1055 is shown in FIG. 7). In an example embodiment, the device depicted as mobile subscriber 1055, which may be a network within network 110 or that connects to network 110, may comprise mobile communications devices 111, 113, and/or 270. Radio access network 1060 comprises a plurality of base station subsystems such as BSSs 1062, which include BTSs 1064 and BSCs 1066. Core network 1070, which may be a network within network 110 or that connects to network 110, comprises a host of various network elements. As illustrated here, core network 1070 may comprise Mobile Switching Center (MSC) 1071, Service Control Point (SCP) 1072, gateway MSC 1073, SGSN 1076, Home Location Register (HLR) 1074, Authentication Center (AuC) 1075, Domain Name Server (DNS) 1077, and GGSN 1078. Interconnect network 1080, which may be a network within network 110 or that connects to network 110, may also comprise a host of various networks and other network elements. As illustrated in FIG. 7, interconnect network 1080 comprises Public Switched Telephone Network (PSTN) 1082, Fixed-End System (FES) or Internet 1084, firewall 1088, and Corporate Network 1089.

A mobile switching center may be connected to a large number of base station controllers. At MSC 1071, for instance, depending on the type of traffic, the traffic may be separated in that voice may be sent to Public Switched Telephone Network (PSTN) 1082 through Gateway MSC (GMSC) 1073, and/or data may be sent to SGSN 1076, which then sends the data traffic to GGSN 1078 for further forwarding.

When MSC 1071 receives call traffic, for example, from BSC 1066, it may send a query to a database hosted by SCP 1072. The SCP 1072 may process the request and may issue a response to MSC 1071 so that it may continue call processing as appropriate.

The HLR 1074 may be a centralized database for users to register to the GPRS network. HLR 1074 may store static information about the subscribers such as the International Mobile Subscriber Identity (IMSI), subscribed services, and a key for authenticating the subscriber. HLR 1074 may also store dynamic subscriber information such as the current location of the mobile subscriber. HLR 1074 may also serve to intercept and determine the validity of destination numbers in messages sent from a device, such as mobile subscriber 1055, as described herein. Associated with HLR 1074 may be AuC 1075. AuC 1075 may be a database that contains the algorithms for authenticating subscribers and may include the associated keys for encryption to safeguard the user input for authentication.

In the following, depending on context, the term "mobile subscriber" sometimes refers to the end user and sometimes to the actual portable device, such as mobile communications devices 111, 113, or 270 used by an end user of the mobile cellular service. When a mobile subscriber turns on his or her mobile device, the mobile device may go through an attach process by which the mobile device attaches to an SGSN of the GPRS network. In FIG. 7, when mobile subscriber 1055 initiates the attach process by turning on the network capabilities of the mobile device, an attach request may be sent by mobile subscriber 1055 to SGSN 1076. The SGSN 1076 queries another SGSN, to which mobile subscriber 1055 was attached before, for the identity of mobile subscriber 1055. Upon receiving the identity of mobile subscriber 1055 from the other SGSN, SGSN 1076 may request more information from mobile subscriber 1055. This information may be used to authenticate mobile subscriber 1055 to SGSN 1076 by HLR 1074. Once verified, SGSN 1076 sends a location update to HLR 1074 indicating the change of location to a new SGSN, in this case SGSN 1076. HLR 1074 may notify the old SGSN, to which mobile subscriber 1055 was attached before, to cancel the location process for mobile subscriber 1055. HLR 1074 may then notify SGSN 1076 that the location update has been performed. At this time, SGSN 1076 sends an Attach Accept message to mobile subscriber 1055, which in turn sends an Attach Complete message to SGSN 1076.

After attaching itself with the network, mobile subscriber 1055 may then go through the authentication process. In the authentication process, SGSN 1076 may send the authentication information to HLR 1074, which may send information back to SGSN 1076 based on the user profile that was part of the user's initial setup. The SGSN 1076 may then send a request for authentication and ciphering to mobile subscriber 1055. The mobile subscriber 1055 may use an algorithm to send the user identification (ID) and password to SGSN 1076. The SGSN 1076 may use the same algorithm and compares the result. If a match occurs, SGSN 1076 authenticates mobile subscriber 1055.

Next, the mobile subscriber 1055 may establish a user session with the destination network, corporate network 1089, by going through a Packet Data Protocol (PDP) activation process. Briefly, in the process, mobile subscriber 1055 may request access to the Access Point Name (APN), for example, UPS.com, and SGSN 1076 may receive the activation request from mobile subscriber 1055. SGSN 1076 may then initiate a Domain Name Service (DNS) query to learn which GGSN node has access to the UPS.com APN. The DNS query may be sent to the DNS server within the core network 1070, such as DNS 1077, which may be provisioned to map to one or more GGSN nodes in the core network 1070. Based on the APN, the mapped GGSN 1078 can access the requested corporate network 1089. The SGSN 1076 may then send to GGSN 1078 a Create Packet Data Protocol (PDP) Context Request message that contains necessary information. The GGSN 1078 may send a Create PDP Context Response message to SGSN 1076, which may then send an Activate PDP Context Accept message to mobile subscriber 1055.

Once activated, data packets of the call made by mobile subscriber 1055 may then go through radio access network 1060, core network 1070, and interconnect network 1080, in a particular fixed-end system, or Internet 1084 and firewall 1088, to reach corporate network 1089.

Thus, network elements that can invoke the functionality of intelligent call transcript systems and methods such as those described herein can include, but are not limited to, Gateway GPRS Support Node tables, Fixed End System router tables, firewall systems, VPN tunnels, and any number of other network elements as required by the particular digital network.

Figure 8:
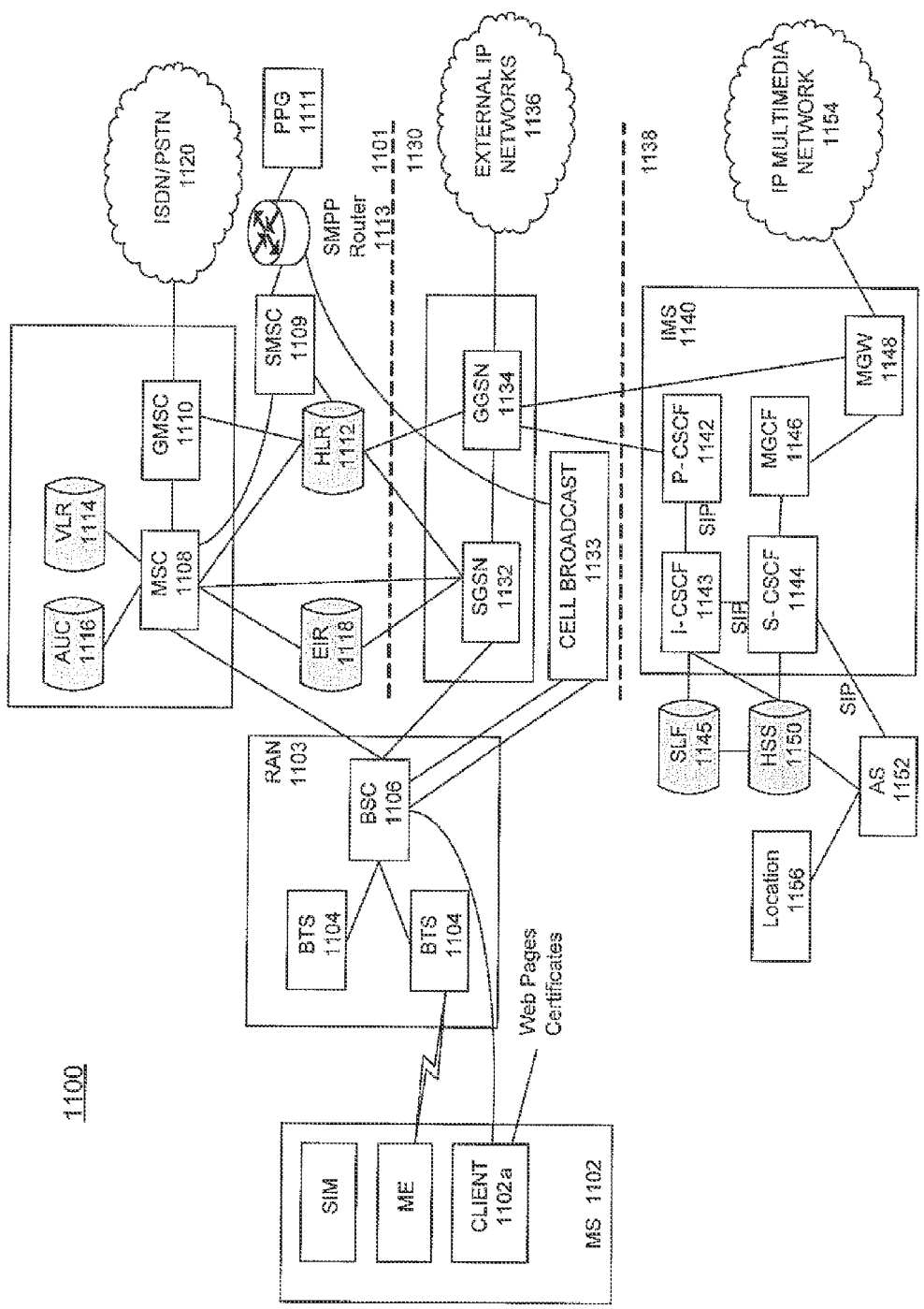
FIG. 8 illustrates a non-limiting alternate block diagram of an exemplary GSM/GPRS/IP multimedia network architecture in which the present subject matter may be implemented.

FIG. 8 illustrates another exemplary block diagram view of a GSM/GPRS/IP multimedia network architecture 1100 in which intelligent call transcript systems such as those described herein can be incorporated. As illustrated, architecture 1100 of FIG. 8 includes a GSM core network 1101, a GPRS network 1130 and an IP multimedia network 1138, any or all of which may be networks within network 110 or networks that connect to network 110. The GSM core network 1101 includes a Mobile Station (MS) 1102, at least one Base Transceiver Station (BTS) 1104 and a Base Station Controller (BSC) 1106. The MS 1102 is physical equipment or Mobile Equipment (ME), such as a mobile telephone or a laptop computer (e.g., mobile communications device 111, 113, or 270) that is used by mobile subscribers, with a Subscriber identity Module (SIM). The SIM includes an International Mobile Subscriber Identity (IMSI), which is a unique identifier of a subscriber. The BTS 1104 may be physical equipment, such as a radio tower, that enables a radio interface to communicate with the MS. Each BTS may serve more than one MS. The BSC 1106 may manage radio resources, including the BTS. The BSC may be connected to several BTSs. The BSC and BTS components, in combination, are generally referred to as a base station (BSS) or radio access network (RAN) 1103.

The GSM core network 1101 may also include a Mobile Switching Center (MSC) 1108, a Gateway Mobile Switching Center (GMSC) 1110, a Home Location Register (HLR) 1112, Visitor Location Register (VLR) 1114, an Authentication Center (AuC) 1118, and an Equipment Identity Register (EIR) 1116. The MSC 1108 may perform a switching function for the network. The MSC may also perform other functions, such as registration, authentication, location updating, handovers, and call routing. The GMSC 1110 may provide a gateway between the GSM network and other networks, such as an Integrated Services Digital Network (ISDN) or Public Switched Telephone Networks (PSTNs) 1120. Thus, the GMSC 1110 provides interworking functionality with external networks.

The HLR 1112 is a database that may contain administrative information regarding each subscriber registered in a corresponding GSM network. Such information may also include call replay preferences for each subscriber. The HLR 1112 may also contain the current location of each MS. The VLR 1114 may be a database that contains selected administrative information from the HLR 1112. The VLR may contain information necessary for call control and provision of subscribed services for each MS currently located in a geographical area controlled by the VLR. The VLR may also contain intelligent call transcription preferences for each subscriber. The HLR 1112 and the VLR 1114, together with the MSC 1108, may provide the call routing and roaming capabilities of GSM, as well as intelligent call transcription functionality. The AuC 1116 may provide the parameters needed for authentication and encryption functions. Such parameters allow verification of a subscriber's identity. The EIR 1118 may store security-sensitive information about the mobile equipment.

A Short Message Service Center (SMSC) 1109 allows one-to-one short message service (SMS), or multimedia message service (MMS), messages to be sent to/from the MS 1102. A Push Proxy Gateway (PPG) 1111 is used to "push" (i.e., send without a synchronous request) content to the MS 1102. The PPG 1111 acts as a proxy between wired and wireless networks to facilitate pushing of data to the MS 1102. A Short Message Peer to Peer (SMPP) protocol router 1113 may be provided to convert SMS-based SMPP messages to cell broadcast messages. SMPP is a protocol for exchanging SMS messages between SMS peer entities such as short message service centers. The SMPP protocol is often used to allow third parties, e.g., content suppliers such as news organizations, to submit bulk messages.

To gain access to GSM services, such as voice, data, short message service (SMS), and multimedia message service (MMS), the MS may first register with the network to indicate its current location by performing a location update and IMSI attach procedure. The MS 1102 may send a location update including its current location information to the MSC/VLR, via the BTS 1104 and the BSC 1106. The location information may then be sent to the MS's HLR. The HLR may be updated with the location information received from the MSC/VLR. The location update may also be performed when the MS moves to a new location area. Typically, the location update may be periodically performed to update the database as location updating events occur.

The GPRS network 1130 may be logically implemented on the GSM core network architecture by introducing two packet-switching network nodes, a serving GPRS support node (SGSN) 1132, a cell broadcast and a Gateway GPRS support node (GGSN) 1134. The SGSN 1132 may be at the same hierarchical level as the MSC 1108 in the GSM network. The SGSN may control the connection between the GPRS network and the MS 1102. The SGSN may also keep track of individual MS's locations and security functions and access controls.

A Cell Broadcast Center (CBC) 1133 may communicate cell broadcast messages that are typically delivered to multiple users in a specified area. Cell Broadcast is one-to-many geographically focused service. It enables messages to be communicated to multiple mobile telephone customers who are located within a given part of its network coverage area at the time the message is broadcast.

The GGSN 1134 may provide a gateway between the GPRS network and a public packet network (PDN) or other IP networks 1136. That is, the GGSN may provide interworking functionality with external networks, and set up a logical link to the MS through the SGSN. When packet-switched data leaves the GPRS network, it may be transferred to an external TCP-IP network 1136, such as an X.25 network or the Internet. In order to access GPRS services, the MS first attaches itself to the GPRS network by performing an attach procedure. The MS then activates a packet data protocol (PDP) context, thus activating a packet communication session between the MS, the SGSN, and the GGSN.

In a GSM/GPRS network, GPRS services and GSM services may be used in parallel. The MS may operate in one three classes: class A, class B, and class C. A class A MS may attach to the network for both GPRS services and GSM services simultaneously. A class A MS may also support simultaneous operation of GPRS services and GSM services. For example, class A mobiles may receive GSM voice/data/SMS calls and GPRS data calls at the same time.

A class B MS may attach to the network for both GPRS services and GSM services simultaneously. However, a class B MS does not support simultaneous operation of the GPRS services and GSM services. That is, a class B MS can only use one of the two services at a given time.

A class C MS can attach for only one of the GPRS services and GSM services at a time. Simultaneous attachment and operation of GPRS services and GSM services is not possible with a class C MS.

A GPRS network 1130 may be designed to operate in three network operation modes (NOM1, NOM2 and NOM3). A network operation mode of a GPRS network may be indicated by a parameter in system information messages transmitted within a cell. The system information messages may direct a MS where to listen for paging messages and how to signal towards the network. The network operation mode represents the capabilities of the GPRS network. In a NOM1 network, a MS can receive pages from a circuit switched domain (voice call) when engaged in a data call. The MS can suspend the data call or take both simultaneously, depending on the ability of the MS. In a NOM2 network, a MS may not receive pages from a circuit switched domain when engaged in a data call, since the MS is receiving data and is not listening to a paging channel. In a NOM3 network, a MS can monitor pages for a circuit switched network while receiving data and vice versa.

IP multimedia network 1138 was introduced with 3GPP Release 5, and may include an IP multimedia subsystem (IMS) 1140 to provide rich multimedia services to end users. IP multimedia network 1138 may be a component of network 110, or may connect to network 110. A representative set of the network entities within the IMS 1140 are a call/session control function (CSCF), a media gateway control function (MGCF) 1146, a media gateway (MGW) 1148, and a master subscriber database, called a home subscriber server (HSS) 1150. The HSS 1150 may be common to the GSM core network 1101, the GPRS network 1130 as well as the IP multimedia network 1138.

The IP multimedia system 1140 may be built around the call/session control function, of which there are three types: an interrogating CSCF (I-CSCF) 1143, a proxy CSCF (P-CSCF) 1142, and a serving CSCF (S-CSCF) 1144. The P-CSCF 1142 is the MS's first point of contact with the IMS 1140. The P-CSCF 1142 may forward session initiation protocol (SIP) messages received from the MS to an SIP server in a home network (and vice versa) of the MS. The P-CSCF 1142 may also modify an outgoing request according to a set of rules defined by the network operator (for example, address analysis and potential modification).

The I-CSCF 1143 forms an entrance to a home network and hides the inner topology of the home network from other networks and provides flexibility for selecting an S-CSCF. The I-CSCF 1143 may contact a subscriber location function (SLF) 1145 to determine which HSS 1150 to use for the particular subscriber, if multiple HSSs 1150 are present. The S-CSCF 1144 may perform the session control services for the MS 1102. This includes routing originating sessions to external networks and routing terminating sessions to visited networks. The S-CSCF 1144 may also decide whether an application server (AS) 1152 is required to receive information on an incoming SIP session request to ensure appropriate service handling. This decision is based on information received from the HSS 1150 (or other sources, such as an application server 1152). The AS 1152 may also communicate to a location server 1156 (e.g., a Gateway Mobile Location Center (GMLC)) that provides a position (e.g., latitude/longitude coordinates) of the MS 1102.

The HSS 1150 may contain a subscriber profile, including intelligent call transcription preferences, and keep track of which core network node is currently handling the subscriber. It may also support subscriber authentication and authorization functions (AAA). In networks with more than one HSS 1150, a subscriber location function provides information on the HSS 1150 that contains the profile of a given subscriber.

The MGCF 1146 may provide interworking functionality between SIP session control signaling from the IMS 1140 and ISUP/BICC call control signaling from the external GSTN networks (not shown.) It may also control the media gateway (MGW) 1148 that provides user-plane interworking functionality (e.g., converting between AMR- and PCM-coded voice.) The MGW 1148 may also communicate with other IP multimedia networks 1154.

Push to Talk over Cellular (PoC) capable mobile telephones may register with the wireless network when the telephones are in a predefined area (e.g., job site, etc.) When the mobile telephones leave the area, they may register with the network in their new location as being outside the predefined area. This registration, however, does not indicate the actual physical location of the mobile telephones outside the pre-defined area.

While example embodiments of intelligent call transcript systems and methods such as those described herein have been described in connection with various communications devices and computing devices/processors, the underlying concepts can be applied to any communications or computing device, processor, or system capable of implementing intelligent call transcript systems and methods described. The various techniques described herein can be implemented in connection with hardware or software or, where appropriate, with a combination of both. Thus, the methods and apparatuses for intelligent call transcript systems and methods, or certain aspects or portions thereof, can take the form of program code (i.e., instructions) embodied in tangible media, such as floppy diskettes, CD-ROMs, hard drives, or any other machine-readable storage medium, wherein, when the program code is loaded into and executed by a machine, such as a computer, the machine becomes an apparatus for an intelligent call transcript system. In the case of program code execution on programmable computers, the computing device will generally include a processor, a storage medium readable by the processor (including volatile and non-volatile memory and/or storage elements), at least one input device, and at least one output device. The program(s) can be implemented in assembly or machine language, if desired. The language can be a compiled or interpreted language, and combined with hardware implementations.

The methods and systems for intelligent call transcription as described herein can also be practiced via communications embodied in the form of program code that is transmitted over some transmission medium, such as over electrical wiring or cabling, through fiber optics, or via any other form of transmission, wherein, when the program code is received and loaded into and executed by a machine, such as an EPROM, a gate array, a programmable logic device (PLD), a client computer, or the like, the machine becomes an apparatus for an intelligent call transcript system. When implemented on a general-purpose processor, the program code combines with the processor to provide a unique apparatus that operates to invoke the functionality of an intelligent call transcript system. Additionally, any storage techniques used in connection with an intelligent call transcript system can invariably be a combination of hardware and software.

While the intelligent call transcript systems and methods have been described in connection with the various embodiments of the various figures, it is to be understood that other similar embodiments can be used or modifications and additions can be made to the described embodiments for performing the same functions of an intelligent call transcript system without deviating from the described systems and methods. For example, one skilled in the art will recognize that an intelligent call transcript system as described in the present application may apply to any environment, whether wired or wireless, and may be applied to any number of such devices connected via one or more communications networks and interacting across such networks. Therefore, intelligent call transcript systems such as those described herein should not be limited to any single embodiment, but rather should be construed in breadth and scope in accordance with the appended claims.

What is claimed is:
1. A method comprising:
 receiving, on a network device, a telephonic communication comprising speech;

transcribing, on the network device, the telephonic communication to generate a transcript;

detecting, on the network device, an instruction generated by a telephone within the telephonic communication;

determining, on the network device, that the telephone is associated with an authorized user; and responsive to detecting the instruction and determining that the telephone is associated with the authorized user, supplementing, on the network device, the transcript with additional information.

2. The method of claim 1, wherein the additional information comprises at least one of a tag, highlighting, a hyperlink, text, or a marking.

3. The method of claim 1, wherein supplementing the transcript with the additional information comprises supplementing a portion of the transcript associated with a predetermined amount of time with the additional information.

4. The method of claim 1, wherein the additional information comprises a hyperlink that links to a portion of an audio recording of the telephonic communication.

5. The method of claim 1, further comprising, responsive to detecting the instruction, transmitting a communication.

6. The method of claim 5, wherein the communication comprises a portion of the transcript.

7. The method of claim 5, wherein the communication comprises a portion of the telephonic communication.

8. A system comprising:

a memory comprising instructions; and a processor coupled to the memory, wherein, when executing the instructions, the processor effectuates operations comprising:

receiving a telephonic communication comprising speech;

transcribing the telephonic communication to generate a transcript;

detecting an instruction generated by a telephone within the telephonic communication;

determining that the telephone is associated with an authorized user; and supplementing the transcript with additional information responsive to detecting the instruction and determining that the telephone is associated with the authorized user.

9. The system of claim 8, wherein the additional information comprises at least one of a tag, highlighting, a hyperlink, text, or a marking.

10. The system of claim 8, wherein the operation of supplementing the transcript with the additional information comprises supplementing a portion of the transcript associated with a predetermined amount of time with the additional information.

11. The system of claim 8, wherein the additional information comprises a hyperlink that links to an audio recording of the telephonic communication.

12. The system of claim 8, wherein the operations further comprise, responsive to detecting the instruction, transmitting a communication.

13. The system of claim 12, wherein the communication comprises a portion of the transcript.

14. The system of claim 12, wherein the communication comprises a portion of the telephonic communication.

15. A computer-readable storage medium that is not a transient signal, the computer-readable storage medium comprising executable instructions, which when executed by a processor, cause the processor to effectuate operations comprising:

receiving a telephonic communication comprising speech;

transcribing the telephonic communication to generate a transcript;

detecting an instruction generated by a telephone within the telephonic communication;

determining that the telephone is associated with an authorized user; and responsive to detecting the instruction and determining that the telephone is associated with the authorized user, supplementing the transcript with additional information.

16. The computer-readable storage medium of claim 15, wherein the additional information comprises at least one of a tag, highlighting, a hyperlink, text, or a marking.

17. The computer-readable storage medium of claim 15, wherein the operation of supplementing the transcript with the additional information comprises supplementing a portion of the transcript associated with a predetermined amount of time with the additional information.

18. The computer-readable storage medium of claim 15, wherein the operations further comprise, responsive to detecting the instruction, transmitting a communication.

19. The computer-readable storage medium of claim 18, wherein the communication comprises a portion of the transcript.

20. The computer-readable storage medium of claim 18, wherein the communication comprises a portion of the telephonic communication.

* * * * *